(12) United States Patent
Sakai (10) Patent No.: US 6,611,743 B2
(45) Date of Patent: Aug. 26, 2003

(54) SUSPENSION FOR A MOTORCYCLE (75) Inventor: Kouji Sakai, Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 10/008,307

(22) Filed: Nov. 13, 2001

(65) Prior Publication Data

US 2002/0103586 A1 Aug. 1, 2002

Related U.S. Application Data (63) Continuation-in-part of application No. 09/709,969, filed on Nov. 10, 2000.

(30) Foreign Application Priority Data

| Nov. 11, 1999 | (JP) | ............................................. 11-320864 |
| Jan. 12, 2000 | (JP) | ........................................... 2000-3385 |
| Dec. 6, 2000 | (JP) | ....................................... 2000-371656 |

(51) Int. Cl.[7] .............................................. B60G 23/00
(52) U.S. Cl. ........................... 701/37; 701/48; 180/116; 280/5.5
(58) Field of Search .............................. 701/37, 36, 48; 180/116, 118; 280/5.5, 5.512, 5.52

(56) References Cited

U.S. PATENT DOCUMENTS

| 4,489,803 | A | * | 12/1984 | Fukuchi ....................... 180/227 |
| 4,568,093 | A | * | 2/1986 | Shimizu et al. ................ 180/41 |
| 4,723,621 | A | * | 2/1988 | Kawano et al. .............. 180/219 |
| 4,972,928 | A | * | 11/1990 | Sirven ......................... 188/269 |
| 5,124,917 | A | * | 6/1992 | Kanamori ................ 280/5.519 |
| 5,263,737 | A | * | 11/1993 | Furuya et al. ........... 280/5.507 |
| 5,268,695 | A | * | 12/1993 | Dentinger et al. ..... 342/357.11 |
| 5,369,974 | A | * | 12/1994 | Tsymberov ................. 73/11.08 |
| 5,486,018 | A | * | 1/1996 | Sakai .................... 280/124.16 |
| 5,529,152 | A | * | 6/1996 | Hamilton et al. ........ 188/266.6 |
| 5,735,372 | A | * | 4/1998 | Hamilton et al. ........ 188/266.6 |
| 6,039,137 | A | * | 3/2000 | Schless ........................ 180/220 |
| 6,073,066 | A | * | 6/2000 | Takahashi ................ 180/89.12 |
| 6,073,731 | A | * | 6/2000 | Ieda ........................... 188/71.5 |

* cited by examiner

*Primary Examiner*—William A. Cuchlinski, Jr.
*Assistant Examiner*—Olga Hernandez
(74) *Attorney, Agent, or Firm*—Ernest A Beutler (57) ABSTRACT

A motorcycle suspension system, which permits, interrelated front and rear shock absorbers of different physical characteristics and having different loading factors. However, an interrelated control is provided for balancing these differences and for providing good dive and squat control without bouncing. In addition, an improved arrangement for testing the cylinder of a hydraulic shock absorber is disclosed.

16 Claims, 4 Drawing Sheets

SUSPENSION FOR A MOTORCYCLE

CROSS REFERENCE TO RELATED APPLICATION

This application is a continuation-in-part of my copending application entitled "VEHICLE SUSPENSION SYSTEM", Ser. No. 09/709,969, no patent yet filed Nov. 10, 2000 and assigned to the assignee hereof.

BACKGROUND OF THE INVENTION

This invention relates to a motor vehicle suspension system and more particularly to an improved suspension system for a motorcycle.

Figure 1:
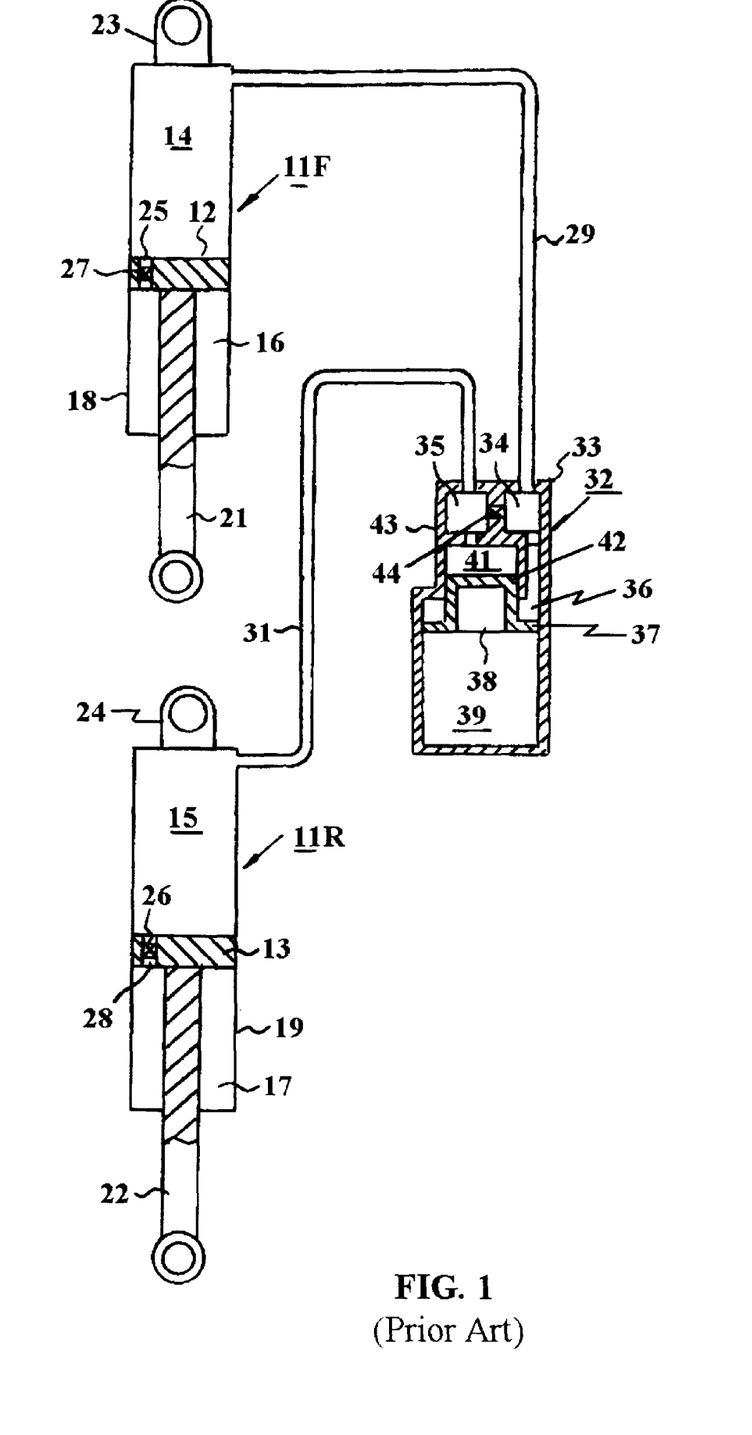
FIG. 1 is a partially schematic view showing a prior art type of motorcycle suspension system.

There has been proposed a type of suspension system for vehicles wherein pairs of shock absorbers are interrelated through a control and interconnecting conduit so as to provide some interaction between the shock absorbers. For example, a system is shown in U.S. Pat. No. 5,486,018, assigned to the assignee hereof, wherein a pair of shock absorbers for a vehicle may be connected either front to rear or side to side so as to provide shock absorbing and also control for either pitch or roll. It has also been proposed to embody such a suspension system in a motorcycle and FIG. 1 illustrates a prior art type of application of this principal.

Referring specifically to this figure, the system includes a front shock absorber 11F and a rear shock absorber 11R. Each of these shock absorbers has a respective piston 12 and 13, which divides the shock absorber into upper chambers 14 and 15 and lower, chambers 16 and 17, respectively. The pistons 12 and 13 reciprocate in cylinders 18 and 19 of the respective shock absorbers 11F and 11R and define these two chambers 14 and 16 and 15 and 17, respectively. The pistons 12 and 13 are connected by respective piston rods 21 and 22 to suitable elements of the vehicle either the vehicle wheel suspension system or the vehicle frame. The cylinders 18 and 19 have trunions 23 and 24 that are connected to the other of the suspension system or vehicle frame.

Flow passages 25 and 26 are provided in the shock absorbers and each has a flow restricting orifice 27 and 28 therein. The size of these orifices determines the damping characteristics.

When the pistons 12 and 13 move upwardly to compress the fluid in the chambers 14 and 15, some of the displaced fluid will flow through the orifices 27 and 28 to the chambers 16 and 17, respectively. However, the positioning of the piston rods 21 and 22 in these chambers occupies some volume and more fluid is displaced from the chambers 14 and 15 than can be accommodated in the chambers 16 and 17.

In accordance with the invention of those earlier mentioned prior art constructions, a conduit having branches 29 and 31 is connected to a damping and control device, indicated generally by the reference numeral 32. This damping and control device 32 is comprised of an outer housing 33 having a pair of chambers 34 and 35 with a dividing wall formed there between. The chamber 34 communicates with a first fluid volume 36 that is formed by an annular portion 37 of a piston 38. A second fluid chamber 39 is formed below this piston 38.

The housing 33 also defines a further fluid chamber 41 that acts on a head portion 42 of the compound piston 38 having the annular portion 37. The areas of the piston head 41 and annular piston portion 37 are equal so that when an equal amount of fluid is displaced from the chambers 14 and 15, the piston 38 will move downwardly so as to accommodate this flow first from the chamber 34 and second from the chamber 35 through a passageway 43 formed internally in the housing 33.

Hence, when the same force is applied and the same displacement of the shock absorber pistons 12 and 13 is experienced, only the damping provided by the orifices 27 and 28 dampens each wheels movement.

If, however, there is a force tending to cause unequal displacement, then flow occurs through an orifice passageway 44 connecting the chambers 34 and 35 so as to provide further damping. If the shock absorbers 11 are mounted on the front or rear wheels, then the damping will control roll. If, on the other hand, the shock absorbers 11 are disposed at front and rear wheels, then pitch and squat are dampened. When used in a motorcycle having only a single front and single rear wheel, this provides dive and squat control.

However, this type of system is effective primarily when the shock absorbers 11 associated with each wheel have the same construction and each bears the same load. However in a motorcycle, the rear shock absorber is more heavily loaded and hence, is usually larger and less compliant than the front shock absorber. As a result, the application of the prior art construction shown in FIG. 1 gives an undesirable effect when applied in a motorcycle.

For example, when both the front and rear wheels experience the same load, then an additional damping is effected by the passage through the orifice 44 which may be undesirable. In addition, this can provide a bouncing motion to the vehicle.

Also, when there is rapid deceleration or rapid acceleration, the dive and squat characteristics will be different and this presents an undesirable effect.

In my aforenoted, copending application there is disclosed an arrangement for primarily a four wheel vehicle where paired shock absorbers have different constructions. Although that application makes reference to the possible use of that construction on vehicles having less than four wheels, such an embodiment is not specifically described nor illustrated.

Therefore, it is a principal object to this invention to provide a suspension system of this type which is particularly adapted for use in motorcycles wherein the two interconnected shock absorbers are constructed differently so as to provide different damping characteristics.

It is a further object to this invention to provide an improved suspension for motorcycles.

It is a yet further object to this invention to provide an interconnected hydraulic damping suspension system for motorcycles wherein the utilization of different shock absorbers for the front and rear wheels can be employed with adverse affects due to the interconnection between the shock absorbers.

SUMMARY OF THE INVENTION

This invention is adapted to be embodied in a suspension system for a motorcycle having two wheels spaced along the length of the vehicle body frame. Suspension systems mount each of the wheels for suspension movement relative to the vehicle body frame. A front damping element had a pair of relatively moveable members that define a first fluid chamber and is interposed between the forward most of the wheels and the vehicle body frame for varying the volume of the first fluid chamber upon suspension of the forward most wheel. A first damping arrangement is provided for damping the flow from the first chamber. A rear damping element also having a pair of relatively moveable members defines a second fluid chamber. The rear damping member is interposed between the other of the wheels and the vehicle body frame for varying the volume of the second fluid chamber upon suspension movement of the other wheel. A second damping arrangement dampens the flow of fluid from the second fluid chamber. The first and second damping elements each have different constructions so that the application of a given force to each of them will affect a different flow from the respective fluid chamber thereof. A conduit interconnects the first and second fluid chambers. A control arrangement in the conduit precludes fluid flow through the conduit in response to a first suspension condition and provides a damped flow through the conduit in response to a second suspension condition.

DETAILED DESCRIPTION OF THE PREFERRED EMBODIMENT OF THE INVENTION

Figure 2:
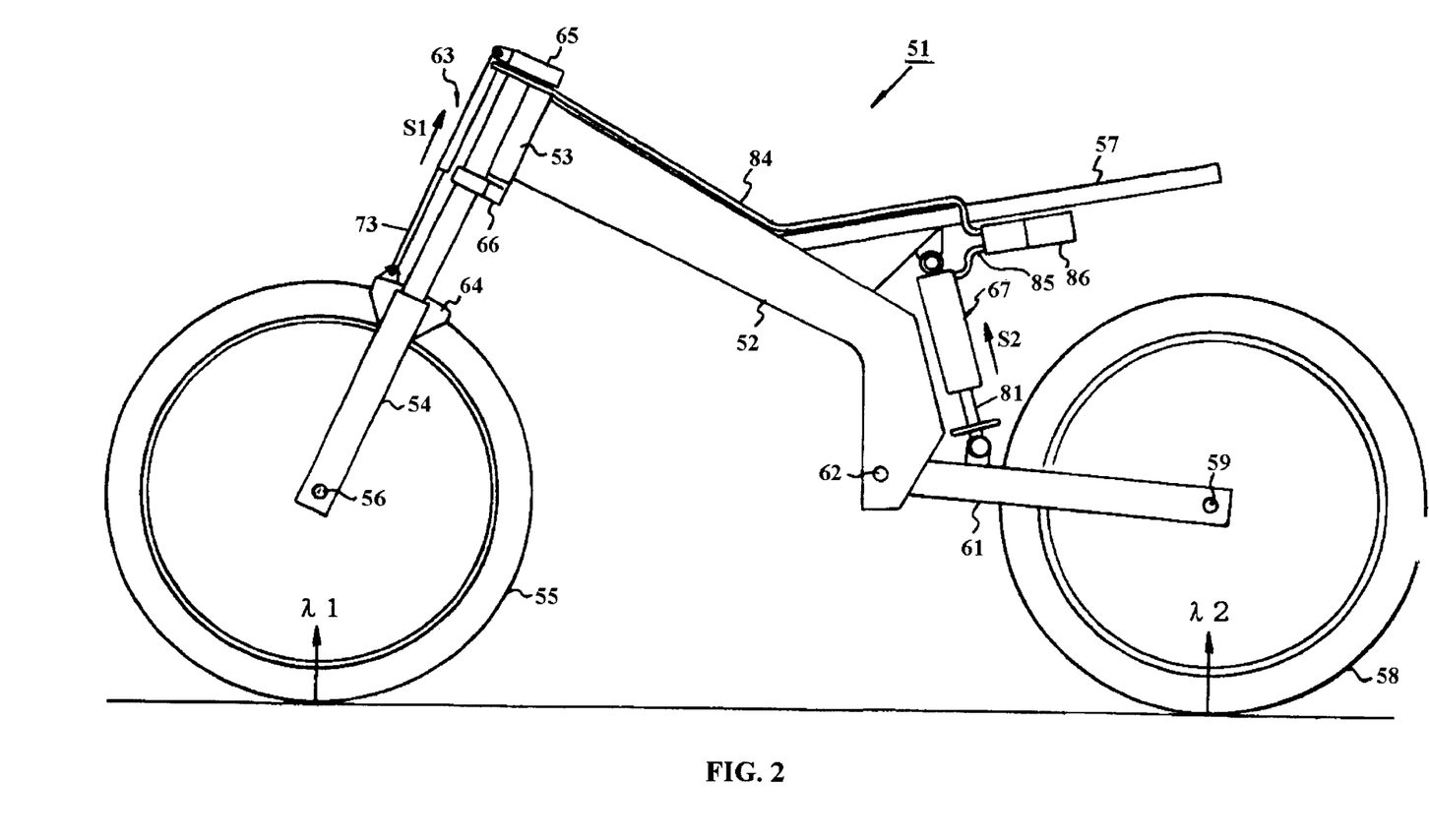
FIG. 2 is a side elevational view of a motorcycle having a suspension system constructed in accordance with an embodiment of the invention.

Referring now in detail to the drawings and initially primarily to FIG. 2, a motorcycle constructed in accordance with an embodiment of the invention and having a suspension system specifically embodying the invention is identified generally by the reference numeral 51. The motorcycle 51 is shown generally in schematic form and includes a body frame 52 which may be of any known type and includes a head pipe 53. A front fork assembly 54 is dirigibly supported in the head pipe 53 and is steered by a handlebar assembly, which is not shown. A front wheel 55 is rotatably journalled at the lower end of the front fork 54 on an axle 56.

A seat rail 57 extends rearwardly from the main frame 52 and accommodates a rider seated on a seat, which is not shown in order to more clearly reveal the structure of the invention.

A rear wheel 58 is journalled about an axle 59 on the rear end of a trailing arm 61. The front end of this trailing arm 61 is journalled on the main frame 52 by a pivot joint 62.

The front wheel 55 is journalled for suspension movement in a vertical direction relative to the frame 52. This suspension arrangement may be of any known type, but includes a front shock absorber 63 which is interposed between a bracket 64 carried by the fork 54 and a bracket 65 affixed relative to the frame 52. A further bracket 66 disposed below the head pipe 53 also supports the front fork 54.

A second shock absorber 67 is interposed between the trailing arm 61 and the seat rail 57 for damping the suspension movement of the rear wheel 58.

Figure 3:
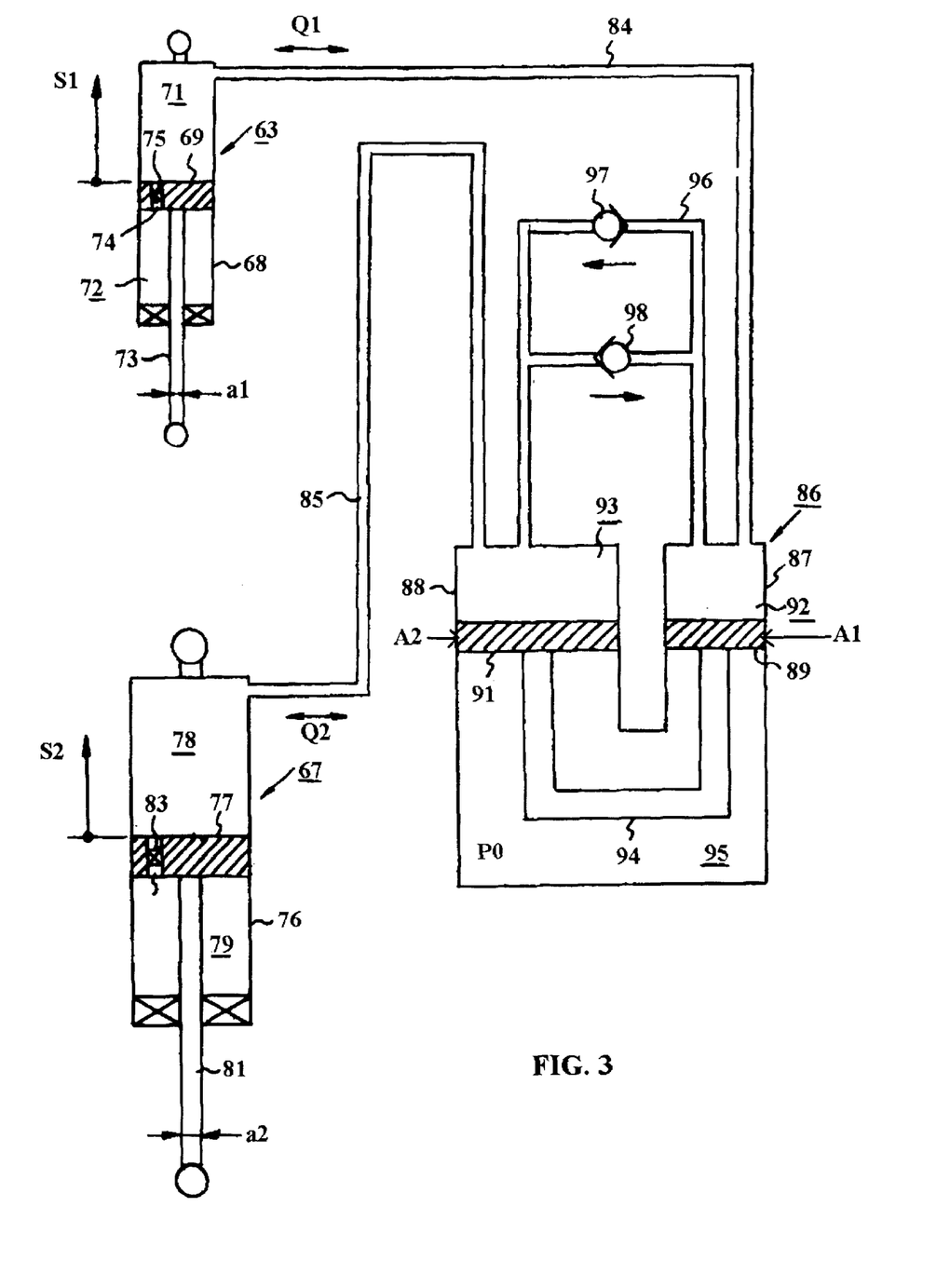
FIG. 3 is a schematic view showing the suspension system of the invention.

Referring now additional to FIG. 3, the detailed construction of the suspension system will be described. As may be seen in this figure, the front shock absorber 63 includes an outer housing 68, which defines a cylinder bore in which a piston 69 reciprocates. The piston 69 divides the cylinder bore into an upper chamber 71 and a lower chamber 72. A piston rod 73 depends from the piston 69 through the lower chamber 72 for its connection to the bracket 64. A flow passage 74 extends through the piston and a damping orifice 75 is positioned in this passage so as to control the damping effect.

In a similar manner, the rear shock absorber 67 includes an outer housing 76, which defines a cylinder bore in which a piston 77 reciprocates. The piston 77 divides this cylinder bore into an upper chamber 78 and a lower chamber 79. A piston rod 81 extends through the lower chamber 79 and provides the connection to the trailing arm 61. A flow passage 82 passes through the piston 77 and a flow controlling orifice 83 is provided therein.

Because of the difference in the weight carried, the front shock absorber 63 is smaller than the rear shock absorber 67 and the piston rod 73 has a diameter a1, which is smaller than the diameter a2 of the rear shock absorber 67. In addition, the stroke of the two shock absorbers indicated by the dimensions S1 and S2 in response to a given degree of suspension travel of each wheel 55 and 58 are different because of the difference in the ways the shock absorbers 63 and 67 are mounted and loaded. For example the lever ratio (amount of wheel movement to amount of shock absorber piston travel) for the front and rear wheels may be such that for the stroke S1 of the front piston the front wheel 55 moves an amount $\lambda 1$ while for the stroke S2 of the rear piston the rear wheel 58 moves an amount equal to $\lambda 2$. Thus the respective lever ratios are equal to $S1/\lambda 1$ and $S2/\lambda 2$ using the foregoing example.

A conduit arrangement comprised of a first conduit 84 and second conduit 85 is provided for interconnecting the shock absorber chambers 71 and 78 with each other. This conduit arrangement comprised of the conduits 84 and 85 is joined at a control arrangement, indicated generally by the reference numeral 86. The control arrangement 86 has a construction comprised an outer housing which defines first and second cylinder portions 87 and 88, associated with the conduits 84 and 85, respectively. Pistons 89 and 91 reciprocate in the cylinder portions 87 and 88, respectively. These pistons 89 and 91 define fluid chambers 92 and 93, respectively with the cylinder portions 87 and 88.

The pistons 89 and 91 are interlinked with each other for simultaneous movement by a cross bar 94, which is disposed in a chamber 95, formed below the pistons 89 and 91 and which has a common portion. The chamber 95 is filled with an inert gas such as nitrogen pressurized to a pressure, which is designated as "P0". This establishes static pressures of P1 and P2 in the fluid chambers 92 and 93, respectively.

The chambers 92 and 93 are interconnected with each other by means of an interconnecting conduit, indicated generally by the reference numeral 96. A first branch of this conduit has a check valve 97, which is configured so as to permit flow from the chamber 92 to the chamber 93 when more than a predetermined pressure exists. In a like manner, an oppositely acting check valve 98 permits flow from the chamber 93 to the chamber 92 when a pressure greater than a predetermined pressure exists. The pressures at which the check valves 97 and 98 open may either be set to be equal to each other or different from each other.

As has been previously noted, flow occurs from the chambers 71 and 78 of the shock absorbers 63 and 67 to compensate for the volume of the respective piston rods 73 and 81. When the same degree of movement occurs as a result of the same force being applied, it is desired to configure the accumulator chambers and specifically the volumes A1 and A2 such that the flow Q1 from the shock absorber 63 is equivalent to the flow Q2 from the shock absorber 67 so that the accumulator pistons 89 and 91 will move equally. If this does not occur, there will be additional damping provided by either the check valve passage 97 or the check valve passage 98, which is undesirable due to the reasons aforenoted. In order to achieve this, then the following relationship must be true:

$$\left(\frac{S_1}{\lambda_1}\right) \times \left(\frac{a_1}{A_1}\right) = \left(\frac{S_2}{\lambda_2}\right) \times \left(\frac{a_2}{A_2}\right) \quad \text{(Equation 1)}$$

If this condition is met, then unnecessary additional damping can be avoided and the bouncing motion previously referred to as objectionable can be prevented. Thus, even though the stroke ratios and areas of the two shock absorbers 63 and 67 are different, the same force and same degree of deflection will occur at each wheel 55 and 58 without additional damping being provided by the control arrangement 86. However, the arrangement is such that there will be damping provided for periods of rapid acceleration and rapid deceleration by having flow through the passages.

It has also been realized that if the equation set forth above is maintained the additional damping force during rapid decelerations and accelerations will be substantially equal as demonstrated mathematically in my aforenoted, copending application, the disclosure of which will be repeated here for completeness.

It should also be noted that typically when the front piston 69 is contracted and the rear piston 77 is extended (as in a panic break) or, on the contrary, when the front piston 69 is extended and the rear piston 77 is contracted (as in rapid acceleration), damping forces are produced within the pressure regulating unit 86 while oil flows through the bypass passage 96 and the associated throttle valves 97, 98. It has been discovered that, unless the damping force under rapid breaking is approximately the same as the damping force in a rapid acceleration, vertical movement of the vehicle body cannot be controlled appropriately. Applicant has proved that the appropriate control of the vehicle body during pitching $$\left( \text{i.e., the rear wheel and the front wheel displacing in mutually opposite directions at approximately the same displacement speed, such as } \frac{d\lambda_1}{dt} = -\frac{d\lambda_2}{dt} \right)$$

can be realized when a suspension system is constructed to satisfy the following equation, which is based upon Equation 1:

$$\left( \text{i.e., } \frac{d\lambda_1}{dt} = -\frac{d\lambda_2}{dt} \right).$$

In Equation 2, $\Delta\phi$ represents the differential pressure ($P_1$–$P_2$) between the first chamber 92 and the second chamber 93, which would cause oil to flow from the first chamber 92 to the second chamber 93.

Equation 2 is derived by obtaining a first condition under which the damping force $F_1$ produced by the first throttle valve 97 during rapid deceleration is equal to the damping force $F_2$ produced through the second throttle valve 98 during rapid acceleration, obtaining a second condition under which the damping force $F_2$ produced through the second throttle valve 98 during rapid deceleration is equal to the damping force $F_1$ produced through the first throttle valve 97 during the rapid acceleration. These two conditions are then evaluated to find a condition under which the two are substantially satisfied at the same time. The equation will be derived below.

When deriving the equation, it is assumed that the vertical displacement speeds of the wheels at the ground contact points are the same in absolute value and represent movement in opposite directions $$\frac{d\lambda_1}{dt} = -\frac{d\lambda_2}{dt} \bigg).$$

To begin with, the condition in which the front piston 69 is compressed and the rear piston 77 is extended will be evaluated. Under this condition, it is assumed that $F_1$ is the damping force produced through the first throttle valve 97 and $F_2$ is the damping force produced through the second throttle valve 98 during compression of the front piston 69 and extension of the rear piston 77. Such a situation would occur during rapid acceleration. In other words, $$\frac{\lambda_1}{dt} > 0, \frac{\lambda_2}{dt} < 0$$

would occur. Therefore, $F_1$ can be expressed as follows:

$$F_1\left(\frac{\lambda_1}{dt} > 0, \frac{\lambda_2}{dt} < 0\right) = a_1 \times (P_1 - P_0) \times \left(\frac{S_1}{\lambda_1}\right) \quad \text{Equation 3}$$

Similarly, F2 can be expressed as follows:

$$F_2\left(\frac{\lambda_1}{dt} > 0, \frac{\lambda_2}{dt} < 0\right) = a_2 \times (P_2 - P_0) \times \left(\frac{S_2}{\lambda_2}\right). \quad \text{Equation 4}$$

Then the differential pressure through the pressure regulating unit 86 can be expressed as follows:

$$P_1 - P_2 = \Delta P. \quad \text{Equation 5}$$

Therefore, the oil pressure working on the free piston (i.e., the piston heads 170, 172) of the pressure regulating unit 86 can be expressed as follows:

$$P_1 \times A_1 + P_2 \times A_2 = P_0 \times (A_1 + A_2) \quad \text{Equation 6}$$

From Equations 3, 4 and 6, the following can be derived:

$$F_1\left(\frac{\lambda_1}{dt} > 0, \frac{\lambda_2}{dt} < 0\right) = a_1 \times \Delta P \times A_2 \times \left(\frac{S_1}{\lambda_1}\right) \bigg/ (A_1 + A_2) \quad \text{Equation 7}$$

Similarly, from Equations 4, 5 and 6, the following can be derived:

$$F_2\left(\frac{\lambda_1}{dt} > 0, \frac{\lambda_2}{dt} < 0\right) = -a_2 \times \Delta P \times A_1 \times \left(\frac{S_2}{\lambda_2}\right) \bigg/ (A_1 + A_2) \quad \text{Equation 8}$$

Now, considering the situation in which $F_1'$ is the damping force produced through the first throttle valve 97 and $F_2'$ is the damping force produced through the second throttle valve 98 in situations involving rapid acceleration (i.e., the front wheel 55 moves down relative to the vehicle body and a rear wheel 58 moves up relative to the body frame 52). In other words, the situation can be described as $$\frac{\lambda_1}{dt} < 0, \frac{\lambda_2}{dt} > 0.$$

In such situations, the damping force $F_1'$ can be expressed as follows:

$$F_1'\left(\frac{\lambda_1}{dt} < 0, \frac{\lambda_2}{dt} > 0\right) = a_1 \times (P_1' - P_0) \times \frac{S_1}{\lambda_1} \qquad \text{Equation 9}$$

The damping force $F_2'$ similarly can be expressed as follows:

$$F_2'\left(\frac{\lambda_1}{dt} < 0, \frac{\lambda_2}{dt} > 0\right) = a_2 \times (P_2' - P_0) \times \frac{S_2}{\lambda_2} \qquad \text{Equation 10}$$

Similar to that described above, the differential pressure through the pressure regulating unit 86 can be described as follows:

$$P_1' - P_2' = \Delta P' \qquad \text{Equation 11}$$

Moreover, the oil pressure that is working on the accumulator chamber 95 of the pressure regulating unit 86 can be expressed as follows:

$$P_1' \times A_1 + P_2' \times A_2 = P_0 \times (A_1 + A_2) \qquad \text{Equation 12}$$

From the Equations 9, 10 and 12, it can be found that:

$$F_1'\left(\frac{\lambda_1}{dt} < 0, \frac{\lambda_2}{dt} > 0\right) = a_1 \times \Delta P' \times A_2 \times \left(\frac{S_1}{\lambda_1}\right) / (A_1 + A_2) \qquad \text{Equation 13}$$

Similarly, from the Equations 10, 11 and 12, it can be found that:

$$F_2'\left(\frac{\lambda_1}{dt} < 0, \frac{\lambda_2}{dt} > 0\right) = -a_2 \times \Delta P' \times A_1 \times \left(\frac{S_2}{\lambda_2}\right) / (A_1 + A_2) \qquad \text{Equation 14}$$

From the above equations, the condition under which the damping force $F_1$ produced through the first throttle valve 97 during rapid deceleration is equal to the damping force $F_2'$ produced through the second throttle valve 98 during rapid acceleration is that the Equation 7 is equal to the Equation 14. Because $$F_1\left(\frac{\lambda_1}{dt} > 0, \frac{\lambda_2}{dt} < 0\right) = F_2'\left(\frac{\lambda_1}{dt} < 0, \frac{\lambda_2}{dt} > 0\right)$$

the equality can be expressed as below:

$$\left(\frac{a_1}{A_1}\right) \times \left(\frac{S_1}{\lambda_1}\right) \times \Delta P = -\left(\frac{a_2}{A_2}\right) \times \left(\frac{S_2}{\lambda_2}\right) \times \Delta P' \qquad \text{Equation 15}$$

Similarly, the condition under which the damping force $F_2$ produced of the second throttle valve 98 during rapid deceleration is equal to the damping force $F_1'$ produced through the first throttle valve 97 during rapid acceleration is that the Equation 8 is equal to the Equation 13. Because, $$F_2\left(\frac{\lambda_1}{dt} > 0, \frac{\lambda_2}{dt} < 0\right) = F_1'\left(\frac{\lambda_1}{dt} < 0, \frac{\lambda_2}{dt} > 0\right),$$

The equality can be expressed with the equation set forth below:

$$\left(\frac{a_1}{A_1}\right) \times \left(\frac{S_1}{\lambda_1}\right) \times \Delta P' = -\left(\frac{a_2}{A_2}\right) \times \left(\frac{S_2}{\lambda_2}\right) \times \Delta P \qquad \text{Equation 16}$$

Because the difference between Equations 15 and 16 is between $\Delta P$ and $\Delta P'$, which are the differential pressures between the pressure $P_1$ in the first chamber 92 and the pressure $P_2$ in the second chamber 93, $\Delta P$ and $\Delta P'$ or $\Delta P'$ and $\Delta P$ may be replaced with $\Delta \phi$ and $\Delta \phi'$.

Making this replacement, the following equation is obtained:

$$\left(\frac{S_1}{\lambda_1}\right) \times \left(\frac{a_1}{A_1}\right) \times \Delta \phi = -\left(\frac{S_2}{\lambda_2}\right) \times \left(\frac{a_2}{A_2}\right) \times \Delta \phi \qquad \text{Equation 17}$$

Equation 17 is the same as Equation 2 set forth above. Accordingly, Equation 2 has been successfully derived.

The damping force characteristics of the first throttle valve 97 and the second throttle valve 98 can be obtained on the basis of the working oil flow rates through the bypass passages 96. In other words, the following equation can be used:

$$\frac{\left(\frac{dQ_1}{dt} - \frac{dQ_3}{dt}\right)}{A_1} = \frac{\left(\frac{dQ_2}{dt} - \frac{dQ_3}{dt}\right)}{A_2} \qquad \text{Equation 18}$$

This equation can be simplified into the equation listed below:

$$\frac{dQ_3}{dt} = \frac{\left(A_2 \times \frac{dQ_1}{dt} - A_1 \times \frac{dQ_2}{dt}\right)}{(A_1 + A_2)} \qquad \text{Equation 19}$$

The damping force characteristics of the first and second throttle valves 97, 98 are obtained by applying the values of $$\frac{dQ_3}{dt}$$

obtained though Equation 19.

Figure 4:
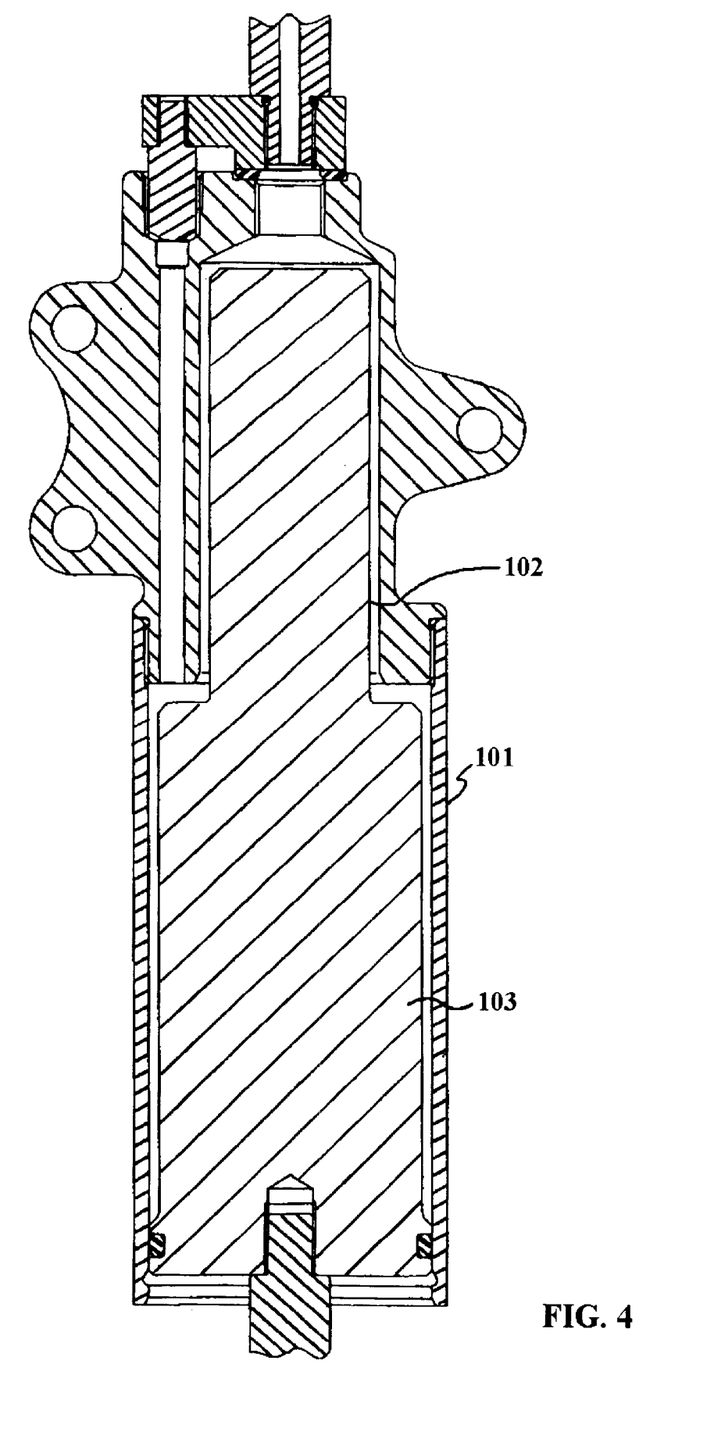
FIG. 4 is a cross sectional view showing a device for pressure testing the cylinder of a shock absorber.

FIG. 4 shows another facet of the invention and this shows a structure for hydraulically testing the cylinder assemblies of shock absorbers. There is normally provided a fixture, indicated generally by the reference 101 that has an internal chamber 102 into which the shock absorber cylinder is positioned. The lower and upper ends are then sealed and the device is pressurized to test it for leakage by leak down from the exterior to the interior of the cylinder.

The problem with this type of arrangement is that there is a large volume and it takes a long time in order for a leak down test to become accurate, if ever. Therefore, in accordance with another feature of the invention, a dummy filler 103 is positioned into the chamber 102 and around which the shock absorber cylinder is positioned. This displaces a substantial volume of the interior of the shock absorber cylinder and permits testing to be done more rapidly and more accurately.

Thus from the foregoing description it should be readily apparent that the described motorcycle and associated suspension system provide very effective damping under all expected conditions even though the front and rear shock absorbers are different in size and in damping lever ratio. Of course the described construction is that of a preferred embodiment and various changes and modifications may be made without departing from the spirit and scope of the invention as defined by the appended claims.

What is claimed is:

1. A motorcycle and suspension system, said motorcycle having a body frame, two wheels spaced axially along the length of said body frame, each supported for suspension movement by said body frame, a front damping element having a pair of relatively moveable members defining a first fluid chamber and interposed between the forward most of said wheels and said body frame for varying the volume of said first fluid chamber upon suspension movement of said forward most wheel, first damping means for damping the flow of fluid from said first fluid chamber, a rear damping element having a pair of relatively moveable members defining a second fluid chamber and interposed between the other of said wheels and said body frame for varying the volume of said second fluid chamber upon suspension movement of said other wheel, second damping means for damping the flow of fluid from said second fluid chamber, said front and said rear damping elements having different physical dimensions so that the application of the same force to each of them will effect a different flow from the respective fluid chamber thereof, a conduit interconnecting said first and said second fluid chambers, and a control arrangement in said conduit for precluding fluid flow through said conduit in response to a first suspension condition and for providing a damped flow through said conduit in response to a second suspension condition.

2. A motorcycle and suspension system, said motorcycle having a body frame, two wheels spaced axially along the length of said body frame, each supported for suspension movement by said body frame, a front damping element having a pair of relatively moveable members defining a first fluid chamber and interposed between the forward most of said wheels and said body frame for varying the volume of said first fluid chamber upon suspension movement of said forward most wheel, first damping means for damping the flow of fluid from said first fluid chamber, a rear damping element having a pair of relatively moveable members defining a second fluid chamber and interposed between the other of said wheels and said body frame for varying the volume of said second fluid chamber upon suspension movement of said other wheel, second damping means for damping the flow of fluid from said second fluid chamber, said front and said rear damping elements having different constructions so that the application of a given force to each of them will effect a different flow from the respective fluid chamber thereof, a conduit interconnecting said first and said second fluid chambers, and a control arrangement in said conduit for precluding fluid flow through said conduit in response to a first suspension condition wherein substantially the same force is applied to the front and rear damping elements at substantially the same time and as a result a different amount of fluid is displaced from each of the fluid chambers and for providing a damped flow through said conduit in response to a second suspension condition.

3. A motorcycle and suspension system, said motorcycle having a body frame, two wheels spaced axially along the length of said body frame, each supported for suspension movement by said body frame, a front damping element having a pair of relatively moveable members defining a first fluid chamber and interposed between the forward most of said wheels and said body frame for varying the volume of said first fluid chamber upon suspension movement of said forward most wheel, first damping means for damping the flow of fluid from said first fluid chamber, a rear damping element having a pair of relatively moveable members defining a second fluid chamber and interposed between the other of said wheels and said body frame for varying the volume of said second fluid chamber upon suspension movement of said other wheel, second damping means for damping the flow of fluid from said second fluid chamber, said front and said rear damping elements having different constructions so that the application of a given force to each of them will effect a different flow from the respective fluid chamber thereof, a conduit interconnecting said first and said second fluid chambers, and a control arrangement in said conduit for precluding fluid flow through said conduit in response to a first suspension condition and for providing a damped flow through said conduit in response to a second suspension condition at least one of said conditions being a condition wherein there is an unequal load on the damping elements at the same time.

4. A motorcycle and suspension system, said motorcycle having a body frame, two wheels spaced axially along the length of said body frame, each supported for suspension movement by said body frame, a front damping element having a pair of relatively moveable members defining a first fluid chamber and interposed between the forward most of said wheels and said body frame for varying the volume of said first fluid chamber upon suspension movement of said forward most wheel, first damping means for damping the flow of fluid from said first fluid chamber, a rear damping element having a pair of relatively moveable members defining a second fluid chamber and interposed between the other of said wheels and said body frame for varying the volume of said second fluid chamber upon suspension movement of said other wheel, second damping means for damping the flow of fluid from said second fluid chamber, said front and said rear damping elements having different constructions so that the application of a given force to each of them will effect a different flow from the respective fluid chamber thereof, a conduit interconnecting said first and said second fluid chambers, and a control arrangement in said conduit for precluding fluid flow through said conduit in response to a first suspension condition and for providing a damped flow through said conduit in response to a second suspension condition, said relatively moveable members of each damping element defining a pair of additional fluid chambers comprised of a third fluid chamber formed by said front damping element and a fourth fluid chamber defined by said rear damping element and wherein the fluid flow from said first and second fluid chambers flows at least in part to the other chamber of the respective damping element.

5. A motorcycle and suspension system as set forth in claim 4, wherein each of the damping elements has a piston rod extending through its respective third and fourth fluid chambers and the flow through the conduit from the respective first and second fluid chambers is caused by the effective volumes displaced by the respective piston rods in said third and fourth fluid chambers.

6. A motorcycle and suspension system as set forth in claim 5, wherein the conduit interconnects the first and second fluid chambers of the first and second damping elements.

7. A motorcycle and suspension system as set forth in claim 6, wherein the different constructions of the first and second damping elements comprises at least different displacement of fluid from the third and fourth fluid chambers upon the application of the given force to said first and second damping elements.

8. A motorcycle and suspension system as set forth in claim 7, wherein different displacement is caused by different diameters of the piston rods.

9. A motorcycle and suspension system as set forth in claim 7, wherein different displacement is caused by different strokes of the piston rods.

10. A motorcycle and suspension system, said motorcycle having a body frame, two wheels spaced axially along the length of said body frame, each supported for suspension movement by said body frame, a front damping element having a pair of relatively moveable members defining a first fluid chamber and interposed between the forward most of said wheels and said body frame for varying the volume of said first fluid chamber upon suspension movement of said forward most wheel, first damping means for damping the flow of fluid from said first fluid chamber, a rear damping element having a pair of relatively moveable members defining a second fluid chamber and interposed between the other of said wheels and said body frame for varying the volume of said second fluid chamber upon suspension movement of said other wheel, second damping means for damping the flow of fluid from said second fluid chamber, said front and said rear damping elements having different constructions so that the application of a given force to each of them will effect a different flow from the respective fluid chamber thereof, a conduit interconnecting said first and said second fluid chambers, and a control arrangement in said conduit for precluding fluid flow through said conduit in response to a first suspension condition and for providing a damped flow through said conduit in response to a second suspension condition said control arrangement comprising at least a first and second accumulator chambers, each of said first and second accumulator chambers each having a respective accumulator piston and a portion of the fluid displaced from said first and second fluid chambers is displaced to said first and second accumulator chambers.

11. A motorcycle and suspension system as set forth in claim 10, wherein the pistons of the accumulator chambers are interconnected to each other for simultaneous movement.

12. A motorcycle and suspension system as set forth in claim 11, wherein the cross sectional areas of the accumulator pistons are different to effect the same displacement thereof when the given force is applied to each of them to effect a different flow from the respective fluid chamber of the respective damping means.

13. A motorcycle and suspension system as set forth in claim 12, wherein the accumulator pistons move in the same direction and are interconnected for simultaneous movement by a cross bar.

14. A motorcycle and suspension system as set forth in claim 12, wherein the accumulator chamber pistons are comprised of concentric pistons one comprising a cylindrical piston and the other comprising an annular piston integrally connected with each other.

15. A motorcycle and suspension system as set forth in claim 12, wherein the conduit means permits damped flow between the first and second damping element chambers in response to the second condition.

16. A motorcycle and suspension system as set forth in claim 15, wherein the conduit is comprised of a pair of oppositely acting check valves.

* * * * *